US009232126B2

(12) United States Patent
McGarry (10) Patent No.: US 9,232,126 B2
(45) Date of Patent: Jan. 5, 2016

(54) APPARATUS FOR ADJUSTING THE FOCUS OF AN IMAGE CAPTURING DEVICE

(71) Applicant: Cognex Corporation, Natick, MA (US)

(72) Inventor: John McGarry, La Jolla, CA (US)

(73) Assignee: Cognex Corporation, Natick, MA (US)

( * ) Notice: Subject to any disclaimer, the term of this patent is extended or adjusted under 35 U.S.C. 154(b) by 53 days.

(21) Appl. No.: 13/773,765

(22) Filed: Feb. 22, 2013

(65) Prior Publication Data
US 2014/0240584 A1    Aug. 28, 2014

(51) Int. Cl.
*H04N 5/232* (2006.01)
*G02B 7/28* (2006.01)
*G02B 13/18* (2006.01)
*G02B 5/00* (2006.01)

(52) U.S. Cl.
CPC ............... *H04N 5/232* (2013.01); *G02B 5/005* (2013.01); *G02B 7/28* (2013.01); *G02B 13/18* (2013.01); *H04N 5/23212* (2013.01)

(58) Field of Classification Search
CPC ............... G03B 21/147; G03B 5/00; H04N 2201/02431; H04N 5/2254; H04N 9/317; H04N 1/1048; H04N 2201/02493
USPC ............... 348/340, 359, 360, 65, 363, 208.4
See application file for complete search history.

(56) References Cited

U.S. PATENT DOCUMENTS

| 4,309,093 | A | 1/1982 | Kuwayama et al. |
| 7,218,448 | B1 | 5/2007 | Cathey, Jr. et al. |
| 7,916,309 | B2* | 3/2011 | Gharib et al. ............... 356/601 |
| 8,020,999 | B2* | 9/2011 | Hirata et al. ............... 353/70 |
| 2010/0079658 | A1* | 4/2010 | Ohara et al. ............... 348/340 |
| 2010/0271496 | A1* | 10/2010 | Obu ............... 348/208.4 |
| 2011/0206291 | A1* | 8/2011 | Kashani et al. ............... 382/255 |

OTHER PUBLICATIONS

"Ch. 2: Just Do It: Design a Digital Camera Lens," Code V Introductory User's Guide, Optical Research Associates (1983), pp. 17-42; downloaded from: http://www.astro.caltech.edu/~lah/ay105/pdf/codev_intro.pdf on Feb. 12, 2015.

(Continued)

*Primary Examiner* — Twyler Haskins
*Assistant Examiner* — Padma Haliyur
(74) *Attorney, Agent, or Firm* — Wilmer Cutler Pickering Hale and Dorr LLP (57) ABSTRACT

Described is an apparatus, including computer program products, for adjusting the focus of an image capturing device. An apparatus for capturing a focused digital image of a scene includes a lens having an optical surface including a deformation that is asymmetric with respect to an optical axis of the lens, and an aperture component configured to adjust a position of the aperture stop of the lens on a plane that is substantially perpendicular to the optical axis of the lens. The apparatus includes an image sensor configured to capture a digital image of an optical image formed by the lens, the digital image being defocused based on the position of the aperture stop. The apparatus includes a digital image processor configured to generate a focused digital image based on the digital image captured by the image sensor.

18 Claims, 6 Drawing Sheets

(56) References Cited

OTHER PUBLICATIONS

Sivokon, et al., "Internal Structure of Bokeh Image in Camera Lenses With Aspheric Surfaces," Proceedings of SPIE—The International Society for Optical Engineering, vol. 8841, pp. 884100-1-884100-14 (2013).

Swaminathan, et al., "Non-Single Viewpoint Caradioptric Cameras: Geometry and Analysis," International Journal of Computer Vision, vol. 66(3), pp. 211-229 (2006).

* cited by examiner

APPARATUS FOR ADJUSTING THE FOCUS OF AN IMAGE CAPTURING DEVICE

TECHNICAL FIELD

The technical field relates generally to computer-based methods and apparatuses, including computer program products, for adjusting the focus of an image capturing device, and in particular to an adjustable optical system operating in cooperation with a digital image capturing and processing system to obtain a focused image representation of a scene.

BACKGROUND

Conventional image capturing systems collect rays of light diverging from points in the object space of a lens, and cause the collected rays to substantially converge at one-to-one corresponding points in image space of the lens that is coincident with the plane of an image sensor. Such image capturing systems often include an aperture stop of adjustable size to control the light rays that pass through the lens. The distance to the object, the size of the aperture, along with the focal length of the lens, determines the location and depth of the useful image field, which should include the image plane of the image sensor to obtain a focused image of the scene. If light rays from a point in the scene are focused by the lens at or near the plane of the image sensor, that point is focused with respect to the image sensor. Conversely, if light rays from a point in the scene are focus by the lens substantially in front of or behind the plane of the image sensor, the point may be out of focus with respect to the image sensor.

If the depth of the scene is shallow or the distance to the scene is large, relative to the focal length of the lens, then instances may arise where most of the light collected from points located on objects of interest in the scene will focus at, or near, the image plane. If, however, the distance to the scene is relatively near and objects of interest in the scene exist at substantially different distances from the lens, it may not always be possible to obtain, at the image sensor plane, an optical image wherein all the objects of interest appear, concurrently, in focus. In such instances, parameters of the optical system must be dynamically changed to selectively focus on one aspect of the scene at a time.

A conventional method for adjusting the focus of a lens is to mechanically move rigid lens elements along the optical axis, relative to the position of the image sensor, thereby moving the position of the image plane. However, such methods can be slow, e.g., due to the physical mass of the objects that must be repositioned. Other methods include using a deformable lens with an adjustable curvature. While deformable lenses may be marginally faster than other mechanical techniques, such devices often lack the optical precision, reliability and temperature stability of conventional optical components. Still other methods involve modifying the refractive index of a liquid crystal material by applying a variable voltage potential resistively impeded in such a way as to control the optical power of a lens element. Other known methods seek to focus the image in the digital domain. These methods involve digital de-convolution of the optical point-spread-function in order to restore a focused digital image. While methods of digital focusing can be very fast, image sensor noise and other limitations of the digital image representation cause such methods to lack the absolute focusing range of devices that focus in the optical domain.

SUMMARY

The computerized methods and apparatus disclosed herein provide for adjusting the focus of a digital image capturing device (e.g., a digital camera) using an asymmetric lens. In some examples, the focal plane of the asymmetric lens is adjusted by offsetting the aperture stop of the lens on a plane perpendicular to the optical axis of the lens. The lens causes light rays collected from points in object space to converge along a caustic curve in image space, therefore no conventional plane of focus exist for the lens, and the fully focus image must be rendered in the digital domain by de-convolution of the point-spread-function of the optical image at the plane of the image sensor, the size and shape of the point-spread-function at the plane of the image sensor being influenced by the offset of the aperture stop.

A brief summary of various exemplary embodiments is presented. Some simplifications and omissions may be made in the following summary, which is intended to highlight and introduce some aspects of the various exemplary embodiments, but not limit the scope of the invention. Detailed descriptions of a preferred exemplary embodiment adequate to allow those of ordinary skill in the art to make and use the inventive concepts will follow in the later sections.

In one aspect, an apparatus for capturing a focused digital image of a scene is featured. The apparatus includes a lens. The lens includes an optical surface that is asymmetric with respect to the optical axis of the lens, and an aperture component configured to adjust a position of the aperture stop of the lens on a plane that is substantially perpendicular to the optical axis of the lens. The apparatus includes an image sensor configured to capture a digital image of an optical image formed by the lens, the point-spread-function of the digital image captured by the image sensor being partially based on the position of the aperture stop. The apparatus includes a digital image processor configured to generate a focused digital image based on the digital image captured by the image sensor.

In another aspect, a computer program product is featured. The computer program product is tangibly embodied in a non-transitory computer readable medium. The computer program product includes instructions being configured to cause a data processing apparatus to capture a digital image of an optical image formed by a lens comprising an optical surface that is asymmetric with respect to an optical axis of the lens, and an aperture component configured to adjust a position of the aperture stop of the lens on a plane that is substantially perpendicular to the optical axis of the lens, wherein the point-spread-function of the digital image captured by the image sensor is partially based on the position of the aperture stop. The computer program product includes instructions being configured to cause a data processing apparatus to generate a focused digital image based on the digital image captured by the image sensor.

In other examples, any of the aspects above can include one or more of the following features. The lens can include a second optical surface that is asymmetric with respect to the optical axis of the lens. The optical surface and second optical surface can be positioned and oriented relative to each other on the optical axis of the lens to provide an optical group that is asymmetric with respect to the optical axis of the lens and substantially symmetric with respect to the plane of the aperture stop.

In some examples, the shape of the optical surface comprises an X, Y polynomial deformation of odd order. The aperture stop can be rectangular in shape. The adjustment component can be further configured to adjust one or more dimensions of the rectangular aperture stop. The adjustment component can include a controllable liquid crystal device.

In other examples, the position of the aperture stop can be adjusted to change a point-spread-function of the digital image captured by the image sensor. The digital image captured by the image sensor can be de-convolved based on the point-spread-function to generate a focused digital image.

The techniques described herein can provide one or more of the following advantages. The system can be focused over a wide range using relatively small movements of low mass components or by virtually massless state transitions (e.g. LCD shuttering device), thus allowing the system to change very quickly from one focus adjustment to another, and can be repeatable in operation over various conditions, such as an extended duration of time and variations in temperature. Because the point-spread-function is not highly sensitive to minor variations in the position of the image plane, the movement of the aperture component does not need to be precise, and, in some examples, a few discrete aperture stop positions are sufficient.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems are provided for capturing, using an image sensor, a digital image of an optical image formed by a lens with an asymmetric surface comprising, for example, a bi-cubic deformation, and de-convolving the digital image to form a focused digital image. The lens can include an aperture component that can be adjusted to position the aperture stop of the lens (e.g., a mechanical aperture, or a liquid crystal optical device).

The optical image formed at the image sensor is distorted due to the asymmetric surface of the lens. A digital image processor or other computing device de-convolves a digital image captured by the image according to the expected point-spread-function to form a focused digital image. In some examples, the expected point-spread-function can be adjusted by moving the lens aperture. In other examples, the expectation of the reconstruction algorithm with respect to the point-spread-function can be adjusted. In still other examples, both the point-spread-function and the expectation of the reconstruction algorithm can be adjusted. Regardless, a digital image captured by the image sensor is de-convolved to form a focused digital image.

Figure 1:
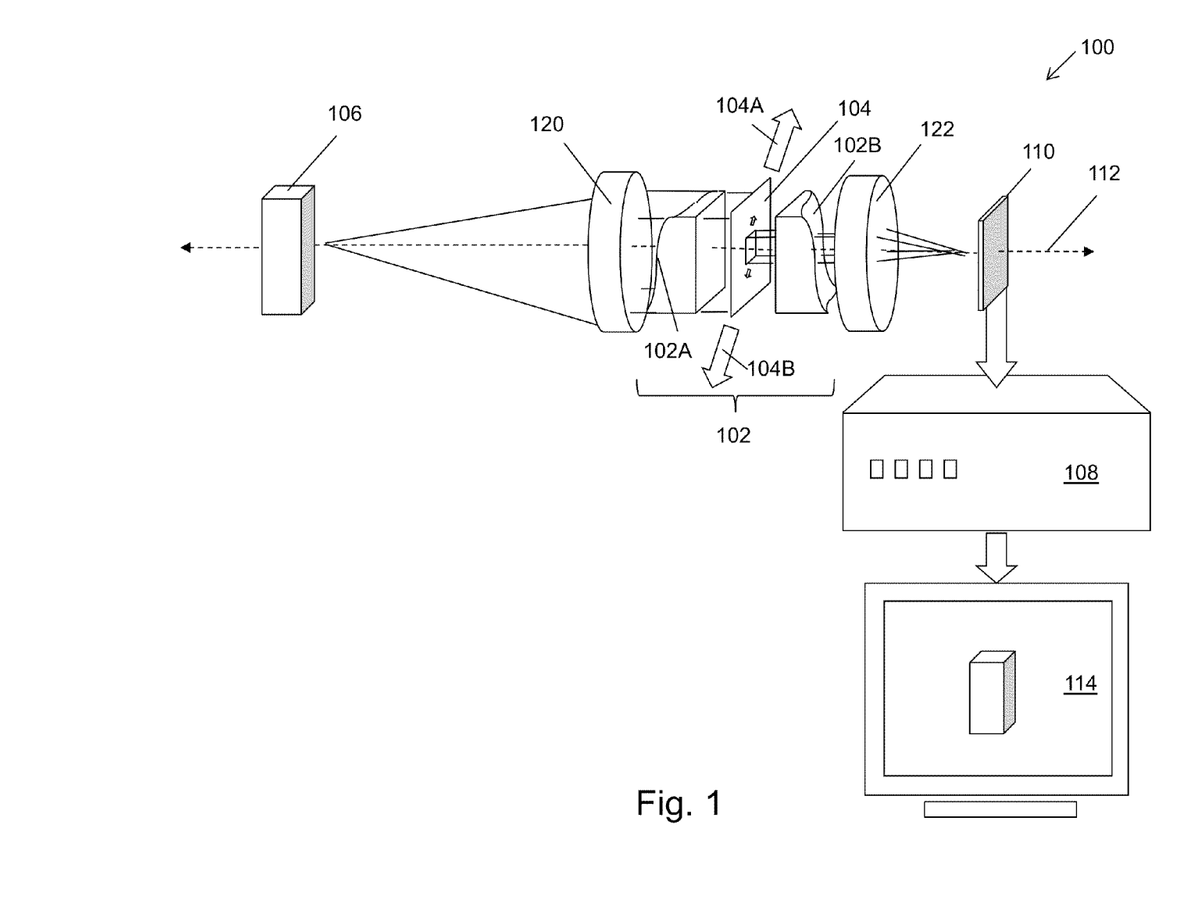
FIG. 1 is an exemplary exploded diagram of an apparatus for adjusting the focus of an image capturing device.

FIG. 1 is an exemplary exploded diagram of an apparatus 100 for adjusting the focus of an image capturing device. The apparatus 100 includes a central lens group 102 and an aperture component 104 for adjusting the aperture of the lens 102. As shown by the arrows 104A and 104B, the aperture component 104 can be adjusted, such as along the diagonal extending from the corners of the aperture component 104 (e.g., in addition to other directions). The apparatus 100 includes outer lens groups 120 and 122. The lens groups 102, 120 and 122 have an optical axis 112, and receive rays of light from a scene 106. The lens groups 120 and 122 operate in cooperation with lens group 102 and aperture component 104 to collect and refract rays of light that travel from the scene, to form an optical image on the plane of image sensor 110. The image sensor 110 is in communication with a digital image processor 108 which can include a processor and a database. The digital image processor 108 can be configured to change the focus of the image sensor 110 (e.g., changing the focus according to some algorithm based on the image data). For example, the digital image processor 108 can be configured to adjust the position of the aperture component 104 to change the focus of the image sensor 110. The digital image processor 108 is in communication with display device 114.

Figure 1A:
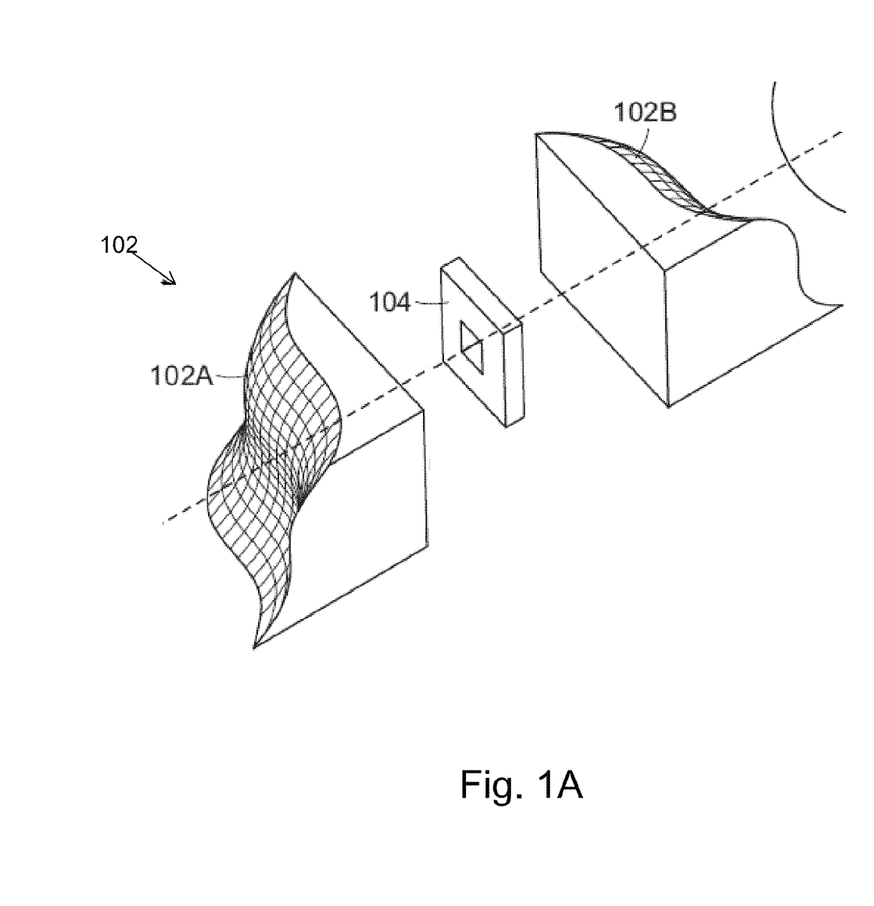
FIG. 1A is a detailed diagram of the lens group of the apparatus for adjusting the focus of an image capturing device from FIG. 1.

Referring to the lens group 102, which is shown in further detail in FIG. 1A, the lens group 102 includes a first optical surface 102A that is asymmetric with respect to the optical axis 112 of the lens 102. For example, as shown in FIG. 1A, the lower-right portion of the optical surface 102A protrudes to the left of a plane formed orthogonal to optical axis 112 along the back-side of the first optical surface 102A, while the upper-right portion does not protrude left. Lens 102 also includes a second optical surface 102B. The second optical surface 102B is asymmetric with respect to the optical axis 112 of the lens 102. In the example shown in FIG. 1, the first and second optical surfaces (102A, 102B) are positioned and oriented relative to each other on the optical axis 112 to provide an optical group that is asymmetric with respect to the optical axis 112 and substantially symmetric with respect to the plane of the aperture stop (e.g., such that the first optical surface 102A is a mirror image of the second optical surface 102B).

The symmetric configuration of lens group 102 is in accordance with the well known principal in optical design, known as the principle of symmetry. Although this concept is normally applied to systems of symmetric spherical lenses as a means to control aberrations including lateral color and coma, the importance to the present invention is that symmetry of asymmetric surfaces 102A and 102B helps to create invariance in the point-spread-function, such that the point-spread-function is significantly identical everywhere in the image plane, including images focused by shifting the aperture stop away from the neutral position at the center of the optical axis.

In some embodiments, lens group 102 comprises two lens elements placed together to form the first and second optical surfaces 102A, 102B. For example, each of the two lens elements being substantially similar in shape, can be rotated relative to each other by 90 degrees about the optical axis then placed back-to-back. The adjustment component can be located between the two lens elements such that the aperture component 104 is proximate to the inward facing surfaces of the two lens elements.

While the optical surfaces 102A and 102B are shown separate from the adjustment component 104, this is for illustrative purposes. As is described further below, in some embodiments the optical surfaces 102A and 102B are substantially adjacent to the adjustment component 104 (e.g., such that the surfaces are in contact with, or nearly in contact with, the adjustment component 104). In some embodiments, the adjustment component 104 is a liquid crystal device (e.g., which is integral with the lens component(s)).

In some embodiments, the asymmetric optical surfaces 102A and 102B comprise a cubic or higher order deformation. For example, the deformation can be an X, Y polynomial of odd order, that causes the optical surface to curve inward at one portion of the surface and then outward at another portion of the surface. Therefore, refraction of light rays at the surface gives the lens a distortion property over two dimensions.

In lens design, the offset from a flat plane is often referred to as sag. In some embodiments asymmetric surfaces 102A and 102B have sag that is an equal function of X and Y raised to an odd power (e.g. a bi-cubic surface uses a power of 3 and sag might be defined by $aX^3+bY^3$, where a=b).

In some embodiments, any kind of aperture component or method for occluding light can be used to position the aperture stop (e.g., mechanical apertures located within two plates, etc.). In some examples, the aperture component can be a mechanical component that adjusts the aperture (e.g., a conventional aperture). In some examples, the aperture component can be a controllable liquid crystal optical device (e.g., controllable by the image sensor 110 and/or the digital image processor). For example, the liquid crystal device can selectively occlude regions in the aperture plane (e.g., to produce, substantially, the same effect as shifting a conventional aperture). A conventional LCD is composed of two parallel glass plates. In some examples, the outward facing surfaces of the plates can be formed into asymmetric surfaces. In some examples, an asymmetric lens element can be bonded or deposited on the LCD glass. Because the controllable liquid crystal optical device may not include moving mechanical parts, it can increase speed and reliability when adjusting the aperture stop, as compared to a mechanical aperture.

While the lens 102 is shown in FIG. 1 with two asymmetric optical surfaces 102A, 102B, the lens can include a single asymmetric optical surface (e.g., just asymmetric optical surface 102A), and/or three or more asymmetric optical surfaces.

The aperture component 104 adjusts the aperture stop of the lens, which is the limiting opening through which rays of light traveling through the lens can pass from the scene being viewed to the image plane of image sensor 110. The aperture component 104 provides for the movement of the aperture stop within certain degrees of freedom. For example, the aperture component can shift the position of the aperture stop to different X, Y coordinates on a plane that is substantially perpendicular to the optical axis 112. As another example, the adjustment component 104 can increase and/or decrease the size of the aperture stop. For example, if the aperture stop is rectangular in shape, the dimensions of the rectangular aperture stop can be adjusted (e.g., to make the rectangle larger, smaller, wider, etc.).

The point-spread-function of the digital image captured by image sensor 110 is a function of the asymmetric optical surface(s) of the lens group 102 and the relative position of the aperture component 104. For example, if the optical surfaces 102A and 102B of lens group 102 include deformation Z, with respect to the plane of the aperture stop, defined by an X, Y polynomial of odd order having equal X, Y coefficients (e.g. $Z=aX^3+bY^3$, where a=b), then moving aperture component 104 along a diagonal line X=Y will cause the point-spread-function formed at the plane of the image sensor to transition to a new plane, either in front of or behind the plane of the image sensor, depending on the direction of movement along the X=Y diagonal.

The digital image processor is configured to generate a focused digital image based on the digital image captured by the image sensor 110. The digital image processor is an example of a computerized system that is specially configured to perform the computerized methods described herein. However, the system structure and content recited with regard to the digital image processor are exemplary only and are not intended to limit other examples to the specific structure described with respect to the digital image processor. As will be apparent to one of ordinary skill in the art, many different configurations of the system 100 suitable to implement the techniques described herein are possible.

In some examples, the digital image captured by the image sensor, represented by the matrix B, can be thought of as having been form from a focused image, represented by the matrix X, and the point-spread-function, represented by two matrices $A_r$ and $A_c$ representing the distortion induced by the point-spread-function on rows and columns of the digital image according to the equation $B=A_c X A_r^T+E$, where the matrix E represents additive noise induced by the image sensor and other sources.

The solution $X=A_c^{-1} B A_r^{-T}$ for the focused image X, given B and the row and column components of the point-spread-function as represented by $A_r$ and $A_c$ is relatively straightforward. However, the noise E which is substantially unknown adds noise term $A_c^{-1} E A_r^{-T}$ into the solution for the focused image X. If the de-convolution kernel, provided by matrix the inverses $A_c^{-1}$ and $A_r^{-T}$, contain too many large coefficients the solution may be ill-conditioned and the noise E that is built into the digital image B, can be amplified in the reconstruction of the focused image X to the extent that the solution is rendered useless. Although there are ways to form the inverse point-spread-function that use expectations relative to the noise E to mitigate the forgoing problem (e.g. regularization methods based on singular value decomposition, and the like), still there is no perfect solution. Therefore, to form the best focus image X it is important that the point-spread-function be formed in such a way that the inverse $A_c^{-1}$ and $A_r^{-T}$ are as well-conditioned as possible. In some applications, The system of FIG. 1 provides an apparatus wherein the point-spread-function providing the best condition solution and, thereby, the best digital reconstruction of the focus image X, can be formed by repositioning aperture component 104.

In addition, information can flow between the elements, components and subsystems described herein using any technique. Such techniques include, for example, passing information between modules in memory, passing the information over a network using standard protocols, such as TCP/IP, and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 2:
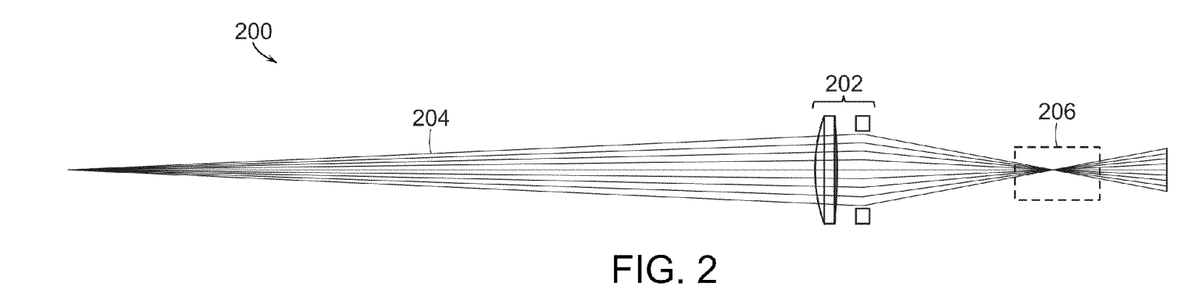
FIG. 2 is an exemplary diagram of a light ray trace of a conventional lens.
Figure 3:
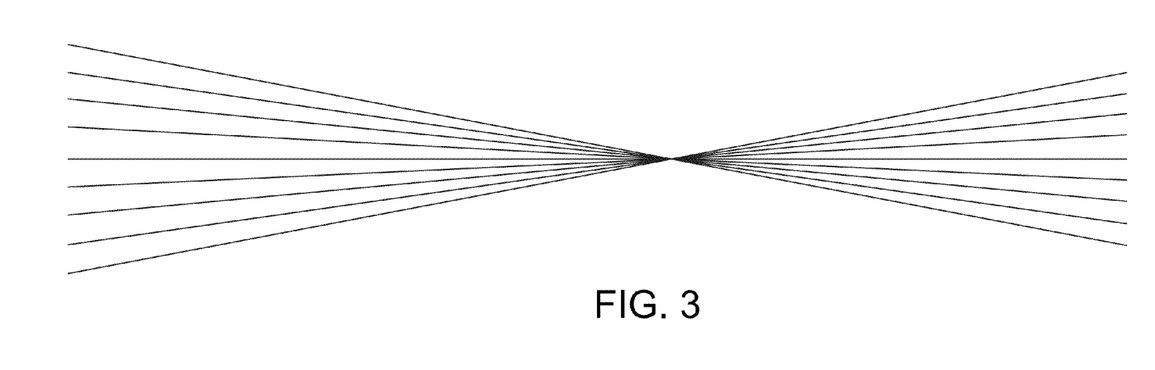
FIG. 3 is an exemplary diagram of the focus point of the conventional lens of FIG. 2.
Figure 4:
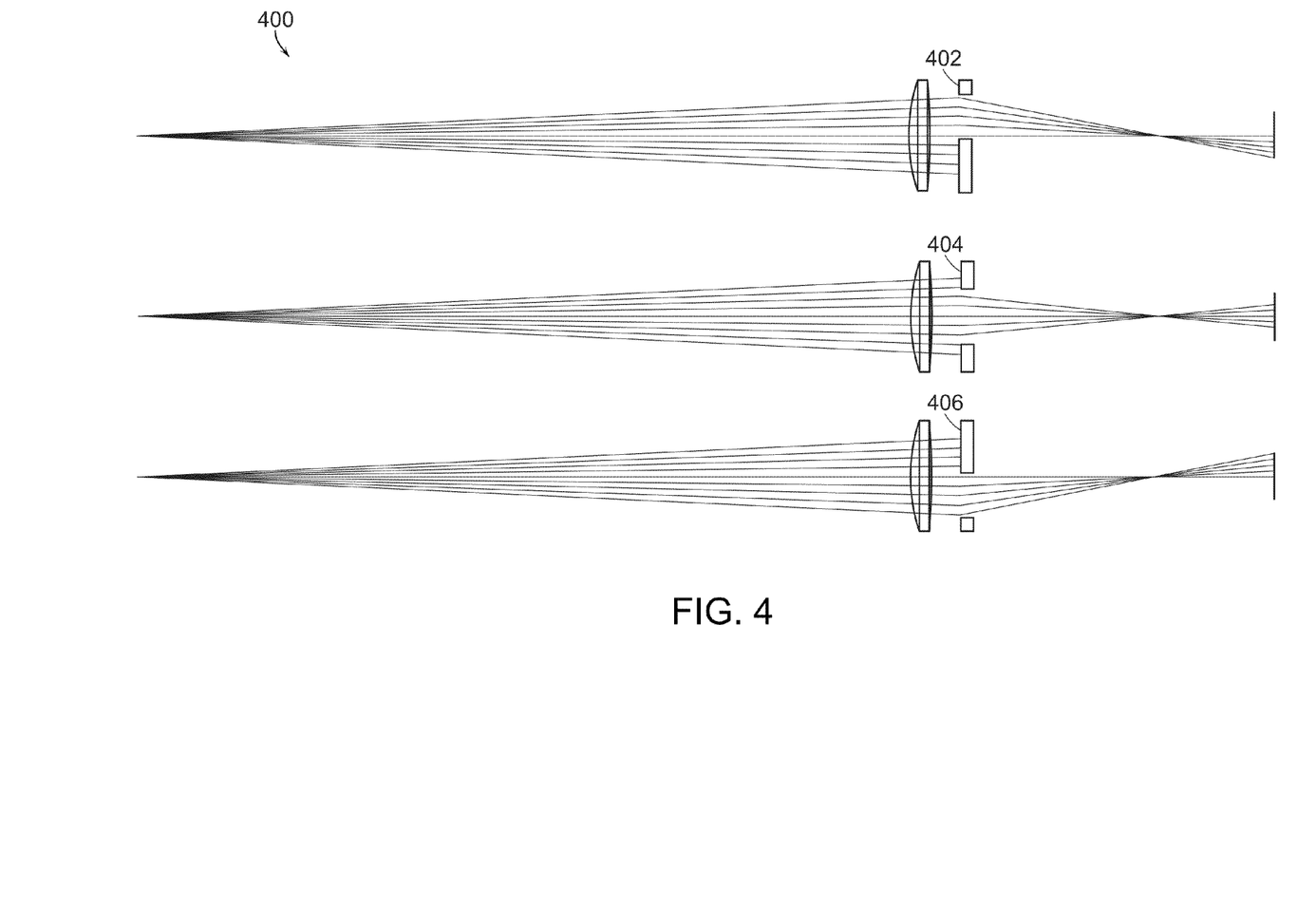
FIG. 4 is an exemplary diagram of shifting the aperture of a conventional lens.

FIG. 2 is an exemplary diagram 200 of a light ray trace of a conventional lens 202. The light rays 204 focus substantially at a point indicated by area 206. Normally a traditional lens (e.g., without an asymmetric surface) has the same power regardless of the location of the aperture. FIG. 3 is an exemplary diagram of the focus point in area 206 of the conventional lens of FIG. 2. FIG. 4 is an exemplary diagram 400 of shifting the aperture of a conventional lens. As shown in FIG. 4, regardless of whether the aperture is at the top position 402, the middle position 404, or the bottom position 406, the lens still focuses substantially on the same plane. Therefore, in some examples adjusting an aperture for a conventional lens does not cause the focal plane of the lens to change.

Figure 5:
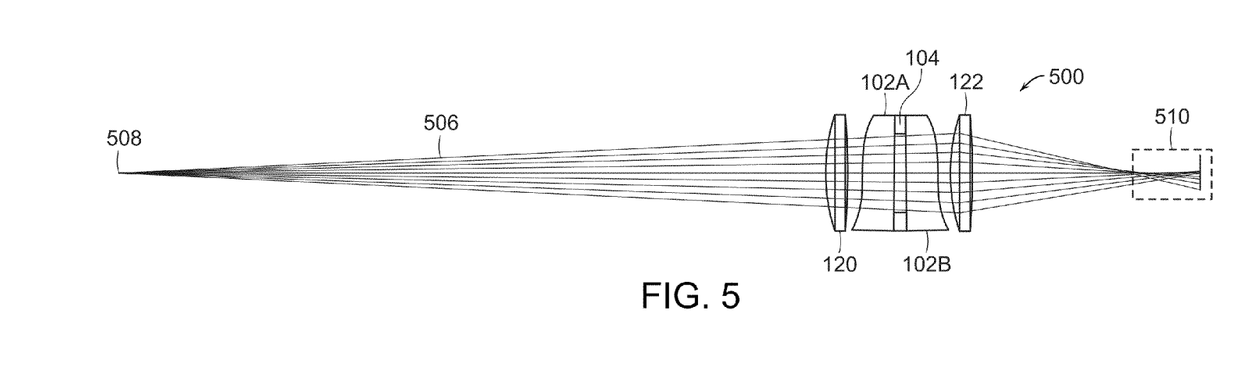
FIG. 5 is an exemplary diagram of a light ray trace of a lens with bi-cubic distortion.
Figure 6:
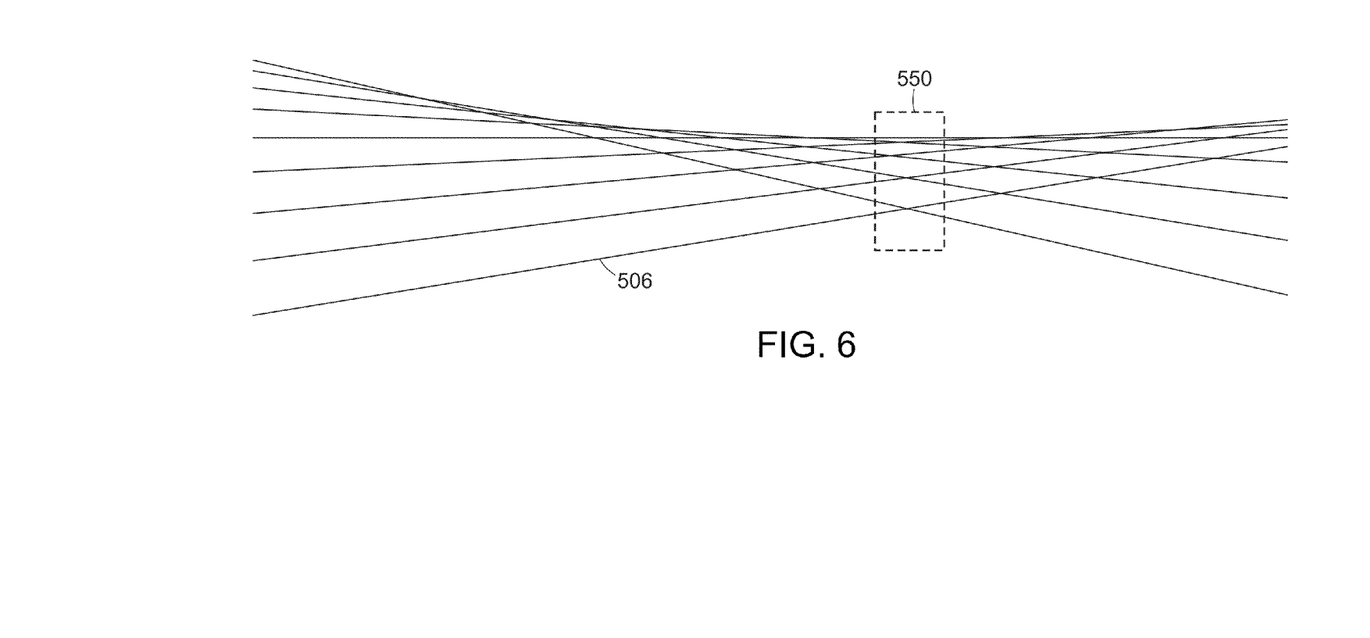
FIG. 6 is an exemplary diagram of the convergence point of the lens with bi-cubic distortion of FIG. 5.

FIG. 5 is an exemplary diagram of a light ray trace 500 of a lens with asymmetric distortion. The asymmetric surfaces 102A, 102B of the lens induces a distortion into the lens system (e.g., the lens system shown in FIG. 1) that prevents rays 506 originating at a point 508 in object space from completely converging at a single point in image space, as shown in the area highlighted by box 510. FIG. 6 is an exemplary expanded diagram of the convergence point of the lens of FIG. 5, as highlighted by box 510. As shown in FIG. 6, even though the rays do not focus at a single point, there is a theoretical point where light rays reach maximum convergence density highlighted with box 550.

Referring to FIG. 5, the asymmetric surface can be, for example, a mixture of concave and convex surfaces. Some rays can converge while others diverge, and in the center the lens is essentially neutral (e.g., referring to equation Z mentioned previously, the X, Y coordinate numbers are small towards the center of the lens, so even if cubed they do not have much effect). So, as shown in FIG. 5 (and more clearly in FIG. 6), the rays at the top of the lens are converging faster than the rays at the bottom of the lens, which are being diverged slightly (or not converging as fast), and the rays in the center are passing relatively "straight" through the lens. Therefore, instead of focusing on a point as seen in FIG. 3, a lens with certain types of asymmetric surface will form a caustic, which is a curved surface of light ray concentration.

Figure 7A:
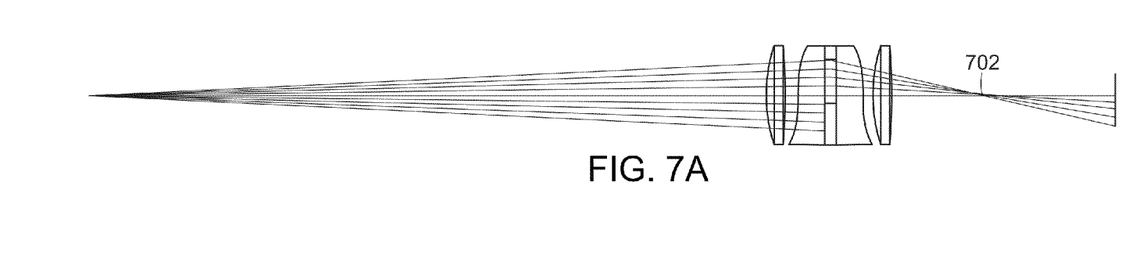
FIG. 7A is an exemplary diagram of light ray convergence for an aperture stop position of a lens with an asymmetric optical surface.
Figure 7B:
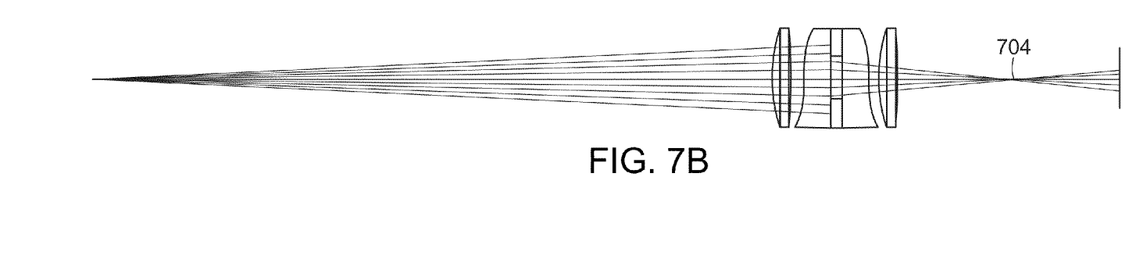
FIG. 7B is an exemplary diagram of light ray convergence for an aperture stop position of a lens with an asymmetric optical surface.
Figure 7C:
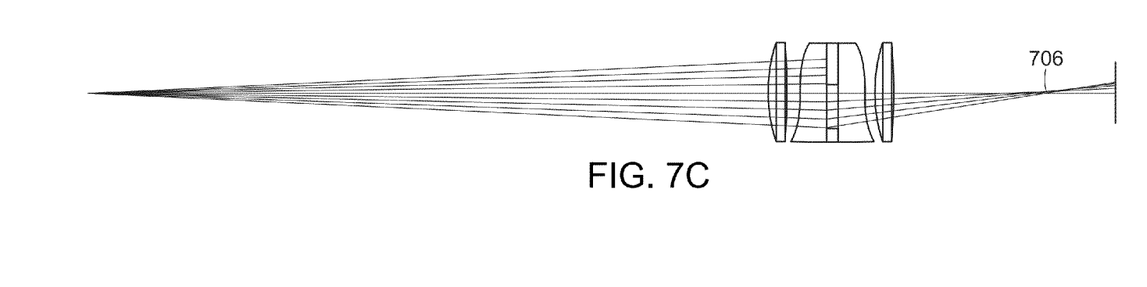
FIG. 7C is an exemplary diagram of light ray convergence for an aperture stop position of a lens with an asymmetric optical surface.

Unlike traditional optical lenses, offsetting the aperture for a lens with asymmetric surfaces can change the focal length of the lens. FIGS. 7A-C includes exemplary diagrams of different light ray convergences for aperture stop locations of a lens with an asymmetric optical surface. The point of maximum convergence or focus can be shifted back and forth in image space by shifting the aperture in a direction on a plane that is orthogonal to the optical axis. FIG. 7A shows that when the aperture is configured to allow the upper light rays to travel through the aperture while blocking the lower rays, the point of maximum convergence is in a first location 702. FIG. 7B shows that when the aperture is configured to allow the central light rays to travel through the aperture while blocking the upper and lower rays, the point of maximum convergence shifts further right to point 704. FIG. 7C shows that when the aperture is configured to allow the lower light rays to travel through the aperture while blocking the upper rays, the point of maximum convergence shifts even further right to point 706 (which is further to the right than in FIGS. 7A-B).

While, for simplicity, FIGS. 7A-C shows shifting the aperture along the Y axis, in practice it is most useful to shift the aperture diagonally, because when the asymmetric surface comprises, for example bi-cubic deformation with equal coefficients for X and Y, shifting the aperture diagonally preserves the general shape of the point-spread-function.

Image sensor 110 captures a digital image of an optical image formed by a lens, wherein the point-spread-function of the digital image is based on the intersection of light rays with the plane of the image sensor. By shifting the aperture component in a plane perpendicular to the optical axis (e.g., by the digital image processor, or a separate computing device configured to control adjustment of the aperture component) the caustic curve formed by the light rays can be displaced along the optical axis to bring the point-spread-function into agreement with the expectation of the digital image processor.

The location of the lens aperture can be shifted, causing the point of maximum convergence of the lens to move back and forth along the optical axis (e.g., as shown in FIGS. 7A-C). Advantageously, the aperture can be adjusted along a plane that is orthogonal to the optical axis easier than, for example, causing lens elements to distort, and/or moving lens elements along the optical axis relative to the image sensor. For example, the aperture can be adjusted using an LCD device, rather than using mechanical components. In some embodiments, the aperture (e.g., a square aperture) can be moved on a diagonal along the plane that is orthogonal to the optical axis.

Normally a traditional lens (e.g., without an asymmetric surface) has the same power regardless of the location of the aperture (e.g., as shown in FIG. 4). As described herein, a lens with an asymmetric optical surface can have different power depending on where the aperture is relative to the optical axis. The power is a function of the position X, Y of the aperture with respect to the optical axis. So moving the aperture around, the lens can achieve a different power (e.g., a different focal length). The power is not quite equivalent in terms of conventional optical systems, since the asymmetric surface causes the lens to not focus at a point, but rather along a curve(s) that intersects the image sensor plane to form a point-spread-function that must be de-convolved to form a focused image.

A lens including asymmetric surface(s) and a fixed aperture stop can be used to extend the depth-of-field of an imaging system (e.g., 100). In such a systems depth-of-field is extended because at the plane of maximum light ray concentration the point-spread-function is relatively easily de-convolved and this characteristic degrades slowly and in a predictable way as the image plane deviates from the optimum location. Various methods for image restoration can be used to form the focused digital image, however, there are limits to which depth-of-field can be extended in this way and these limits are partially a function of the same parameters that restrict the depth-of-field of a conventional lens, such as the F# of the lens which when small will cause the conditioning of the point-spread-function to degrade more rapidly than for a larger F#. In some instances such systems still require some means of optical focus adjustment in order to image the entire scene.

Similar to the fixed aperture extended depth-of-field methods, the system can be configured to deal with the fact that the point spread function is not the same for each location of the aperture (e.g., as shown in FIGS. 7A-C). The de-convolution process can be simplified due to a priori knowledge of the point-spread-function (e.g., the point-spread-function of the optical image, which can be determined based on the aperture stop), its separability by rows and columns, and/or the conditioning of the inverse transform (e.g., by changing the de-convolution algorithm).

Even though the digital image captured by the image sensor needs to be de-convolved to form a focused image, in some applications, the system can achieve a much greater rate of focus adjustment as compared to other known techniques. Such results are achieved by combining computational optics to complete the optical system in the digital domain. The combined system, in effect, has a depth-of-focus that is wide, as compared to conventional optical systems of the same F/# and a focal length that can be varied rapidly according to the position of the aperture stop.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, digital signal processors, and any one or more processors of any kind of digital computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. A computer can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An apparatus for capturing a focused digital image of a scene, comprising:
   a lens system comprising:
      a first lens element, wherein the first lens element comprises a first optical surface that is asymmetric with respect to an optical axis of the lens system; and
      an aperture component configured to adjust a center position of an aperture stop of the lens system on a plane in order to adjust a focal length of the lens system;
   an image sensor configured to capture a digital image of an image formed by the lens system at an image plane;
   a digital information storage device containing information including a digital representation of a point-spread-function formed at the image plane;
   a digital image processor, in communication with the image sensor and the digital information storage device, configured to form a focused digital image based on the digital image captured by the image sensor and the point-spread-function; and
   a second lens element comprising a second optical surface that is asymmetric with respect to the optical axis of the lens system, said first optical surface and said second optical surface being positioned and oriented relative to each other on the optical axis of the lens system to provide that the lens system is symmetric with respect to the plane of the aperture stop.

2. The apparatus of claim 1, wherein a shape of the first optical surface comprises a polynomial deformation that causes the first optical surface to curve inward at a first portion and outward at a second portion.

3. The apparatus of claim 2, wherein the aperture component is configured to form an aperture stop that is rectangular in shape.

4. The apparatus of claim 3, wherein the aperture component is further configured to adjust the height and width of the rectangular aperture stop.

5. The apparatus of claim 1, wherein the adjustment component comprises a controllable liquid crystal device.

6. The apparatus of claim 1, wherein a first shape of the first optical surface and a second shape of the second optical surface are similar.

7. The apparatus of claim 6, wherein the second lens element is rotated relative to the first lens element about the optical axis of the lens system.

8. The apparatus of claim 7, wherein the second lens element is rotated relative to the first lens element by 90 degrees.

9. The apparatus of claim 1, wherein at least a portion of the first lens element and at least a portion of the second lens element are in contact with the adjustment component.

10. The apparatus of claim 9, wherein the aperture component is configured to adjust the position of the aperture stop diagonally on the plane to adjust the focal length of the lens system while preserving a general shape of the point-spread function.

11. An imaging system comprising:
    a first lens element comprising a first optical surface that is asymmetric with respect to an optical axis of the lens system;
    an adjustment component configured to adjust a center position of an aperture stop of the lens system on a plane, thereby modifying a focal length of the lens system; and
    a second lens element having a second optical surface that is asymmetric with respect to the optical axis, and wherein the adjustment component is disposed between the first lens element and the second lens element.

12. The imaging system of claim 11, wherein the first optical surface and the second optical surface have a similar shape.

13. The imaging system of claim 12, wherein the second lens element is rotated relative to the first lens element about the optical axis of the lens system.

14. The imaging system of claim 11, wherein a shape of the first optical surface comprises a polynomial deformation that causes the first optical surface to curve inward at a first portion and outward at a second portion.

15. The imaging system of claim 14, wherein the adjustment component is configured to adjust the position of the aperture stop diagonally on a plane that is perpendicular to the optical axis of the lens in order to adjust the focal length while preserving a general shape of a point-spread function.

16. The imaging system of claim 11, wherein the adjustment component comprises a controllable liquid crystal device.

17. The imaging system of claim 11, wherein at least a portion of the first lens element and at least a portion of the second lens element are in contact with the adjustment component.

18. The imaging system of claim 11, wherein the first lens element and the second lens element are disposed such that the first optical surface is a mirror image of the second optical surface.

* * * * *